Dec. 14, 1965    E. E. NESLUND    3,222,788

DIAL INDICATOR CALIPER GAGE

Filed Oct. 25, 1963    2 Sheets-Sheet 1

INVENTOR.
EDDIE E. NESLUND.
BY
Willard S. Grout
ATTORNEY.

Dec. 14, 1965  E. E. NESLUND  3,222,788
DIAL INDICATOR CALIPER GAGE
Filed Oct. 25, 1963  2 Sheets-Sheet 2

INVENTOR.
EDDIE E. NESLUND.
BY
Willard S. Grow
ATTORNEY.

United States Patent Office 3,222,788
Patented Dec. 14, 1965

3,222,788
DIAL INDICATOR CALIPER GAGE
Eddie E. Neslund, 1241 S. 27th, Phoenix 34, Ariz.
Filed Oct. 25, 1963, Ser. No. 318,893
4 Claims. (Cl. 33—148)

This invention pertains to improvements in dial indicator caliper gages.

This invention is related to my earlier Patent Number 3,070,891 issued January 1, 1963.

One of the objects of this invention is to provide a dial indicator caliper gage which is fast and easy to adjust to any sized hole within the range of the particular sized gage used.

Another object of this invention is to provide a dial indicator caliper gage wherein the various dial indicators are readily interchangeable to obtain any desired accuracy of indication required.

A further object of this invention is to provide a dial indicator caliper gage with an arm that contacts the work and an indicator point that has radii such that when the arm moves to probe the distance of two points of size variation, there is obtained a direct reading of the size difference.

It is also another object to provide in connection with the aforementioned gage an arrangement wherein the two contact points that contact the work to be measured are always moved in a straight line keeping the two contact points and a centering plunger in straight alignment with the center of the hole being measured.

The device herein contemplated includes two contact points that measure the hole size and which are so constituted as to measure very shallow holes and ledges, both internal and external dimensions with equal facility.

Another object is to provide in the gage device a centering plunger that can be adjusted by an adjusting screw in the plunger to contact different size radii and ledges to limit travel for easier entrance of the gage in the hole to be measured.

Also, it is an object to have the pivot bearing located in an intermediate position of the length of the arm between the point that contacts the work and stem of the dial indicator, and to position the dial indicator on the gage frame to change the degree of sensitivity required and to accommodate the gage to various types of dial indicators.

Further, it will be noted that an object is to provide two contact points that can be set to a predetermined size by gage blocks, plug gage, ring gage or micrometers for duplicating hole size or distance between two parallel objects; the device being also usable to take a reading of a hole or two parallel objects and then check the two contact points by a ring gage, gage blocks or micrometer.

And still another object of this invention is to provide a gage as aforementioned that can be used on any machine to measure hole size, outside diameter, or distance between two parallel objects to the correct size without taking the part off the machine or moving the cutting tool off location relative to the work in order to take a reading or measurement of the part being machined.

Further features and advantages of this invention will appear from a detailed description of the drawings in which.

Figure 2:
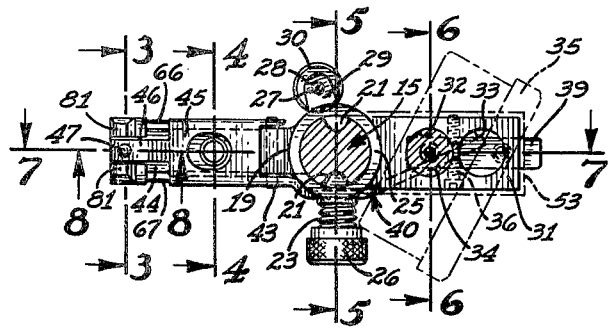
FIG. 2 is an end view of the gage partly in section as indicated by the line 2—2 of FIG. 1.
Figure 3:
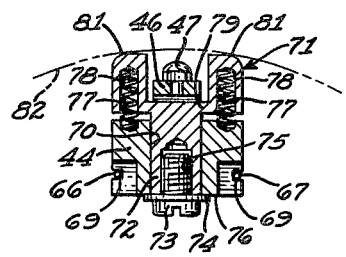
FIG. 3 is an enlarged fragmentary sectional view of the gage shown by the line 3—3 of FIG. 2.
Figure 4:
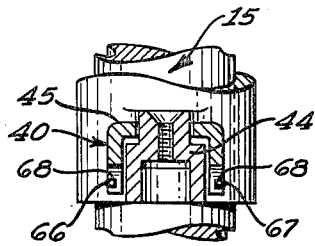
FIG. 4 is an enlarged sectional view on the line 4—4 of FIG. 2.
Figure 1:
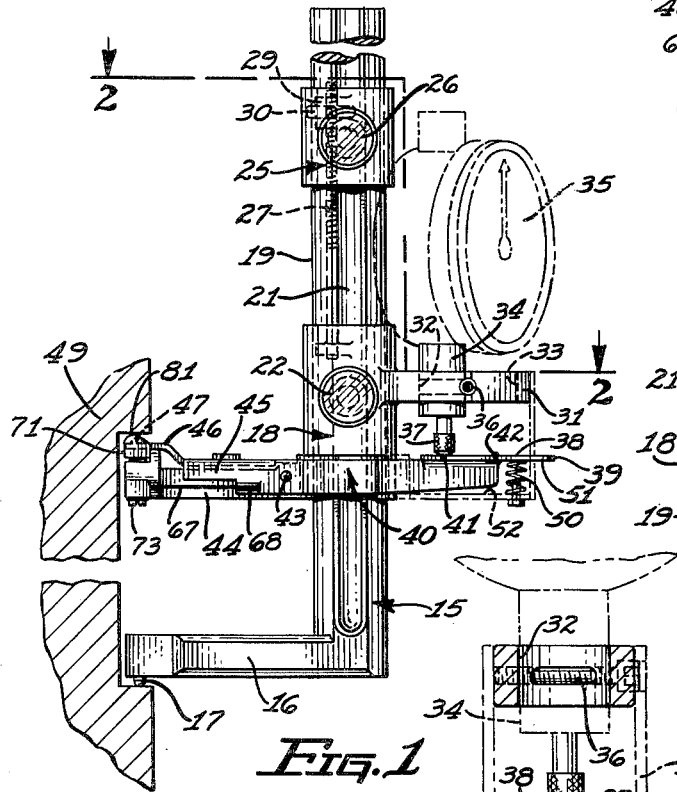
FIG. 1 is a side elevation of a dial indicator caliper gage incorporating the features of this invention.

As an example of one embodiment of this invention, there is shown a dial indicator caliper gage incorporating the features of this invention comprising a frame 15 having the integral anvil arm 16 on the outer end of which is fixed the work contacting anvil 17. The setting carriage 18 is slidably mounted on the cylindrical surface 19 of the main frame 15 and a clamping plug 20 engages the clamping grooves 21 of the frame 15 with a clamping thumb screw 22 threaded to the stem 23 formed on the carriage 15 and which engages the compression spring 24 in the plug 20 so as to clamp the carriage in any desired longitudinally adjusted position on the frame 15.

Figure 5:
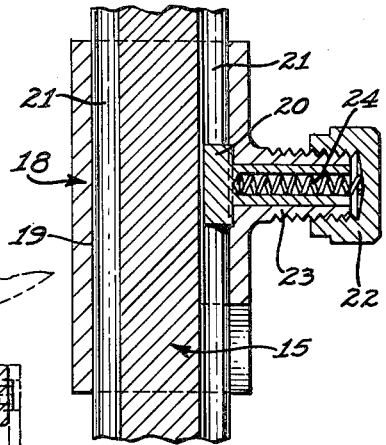
FIG. 5 is an enlarged fragmentary sectional view on the line 5—5 of FIG. 2.
Figure 6:
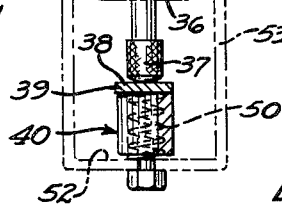
FIG. 6 is an enlarged fragmentary sectional view on the line 6—6 of FIG. 2.
Figure 7:
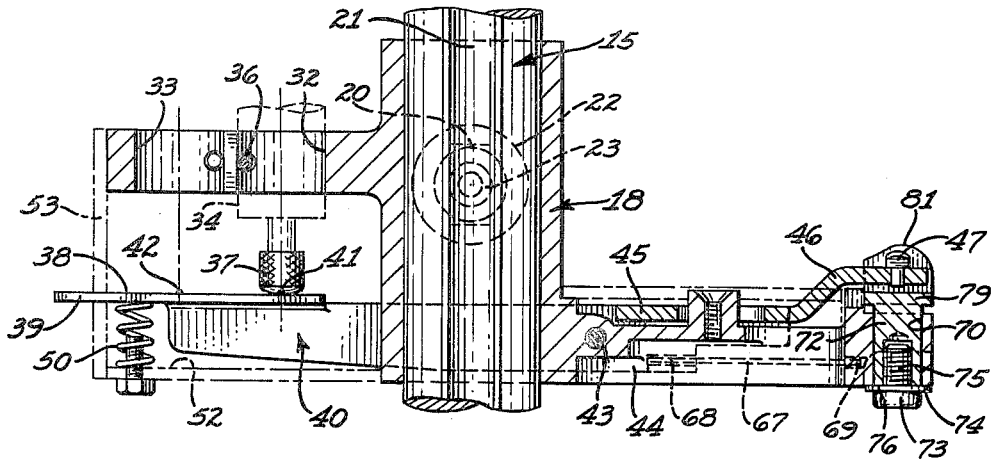
FIG. 7 is an enlarged fragmentary sectional view on the line 7—7 of FIG. 2.

Preferably a vernier positioning device is utilized for the setting carriage comprising a vernier carriage 25 slidably mounted on the cylindrical surface 19 of the frame 15 and clampable thereto at adjusted positions by a clamping thumb nut 26, the plunger and spring mounted on the frame 25 as in the arrangement shown in FIG. 5 described above. A positioning screw 27 is suitably fixed to the setting frame 18 and extends through clearance bore 28 in the boss 29 formed on the vernier frame 25 and has threadedly mounted thereon the adjusting nut 30 having side faces appropriately abuttingly engaging the boss 29 of the vernier carriage 25 so that when the vernier carriage 25 is locked to the frame 15 by tightening the thumb screw 30 and with the thumb screw 22 released, rotating of nut 30 in the desired direction precisely positions the setting carriage 18 on the frame 15.

A dial gage clamping bracket 31 is formed integral with the setting carriage 18 and has a pair of longitudinally spaced bores 32 and 33 each adapted to receive the mounting barrel 34 of a dial indicator 35. A suitable clamp screw 36 common to both bores 32 and 33 is provided on the clamping bracket 31 to secure the dial gage barrel in one or the other of the bores 32 and 33. The dial indicator 35 has the usual actuating stem 37 which contacts the abutment surface 38 on contact plate 39 on the outer end of the arm 40 at either point 41 or point 42 located on the abutment surface 38. The arm 40 is pivotally mounted on the pin 43 which is fixed in the extension portion 44 formed integral with the setting frame 18. The arm 40 has a forward extension 45 forwardly of the pin 43 from which forwardly extends the integral sensing anvil arm 46 having the internal work contacting sensing anvil 47 which is adapted to engage an internal work surface 48 on a workpiece 49. By providing the multiple hole arrangement 32 and 33 in the dial gage clamping bracket, the gage is adapted to accommodate different types of dial indicators 35 having various calibrations and to change the sensitivity of the device by changing the pivoting ratio between the pivot pin 43, the contact point anvil 47 and the contact points 41 and 42 of the stem 37 of the dial indicator 35.

A compression spring 50 is presented between the underside 51 of the contact plate 39 and the upwardly facing surface 52 of a cover 53 fixed to the setting carriage 18 to provide a damping action for the rocking of the lever 40 on the pin 43 and to balance out the downward spring presusre from the actuating stem 37 of the dial indicator 35.

Figures 8, 10:
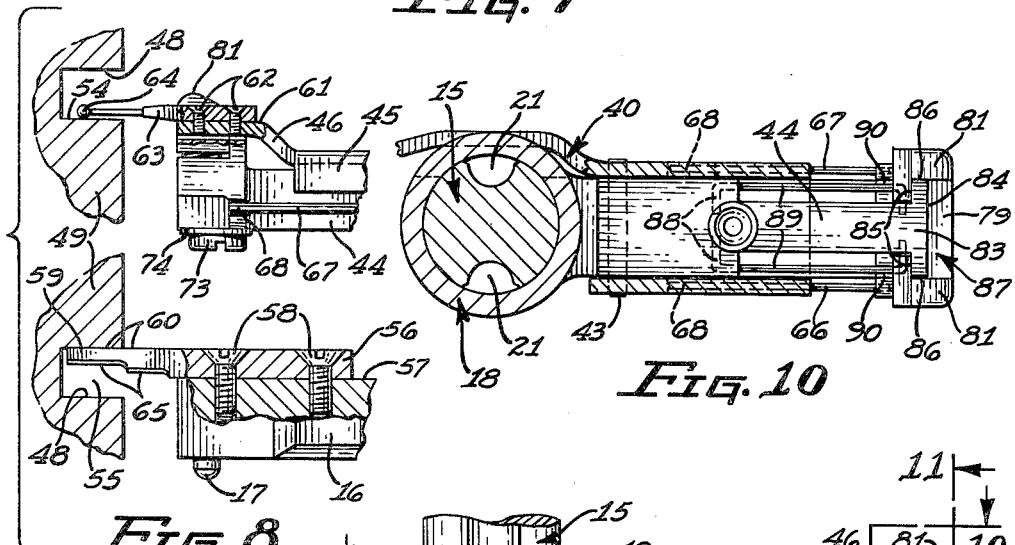
FIG. 8 is an enlarged fragmentary sectional view on the line 8—8 of FIG. 2 but showing the attachments for adapting the caliper for external measurements.
FIG. 10 is a fragmentary sectional view on the line 10—10 of FIG. 9.

The dial indicator caliper is equally well adapted for measuring external surfaces 54 in difficult hard to get at locations such as in the slot 55 shown in FIG. 8. For external measurements under such conditions there is provided an auxiliary anvil piece 56 secured to the surface 57 of the anvil arm 16 by suitable screws 58 and having an extended end portion 59 having the work contacting surface 60. Fixed to the surface 61 by suitable screws 62 is the extension sensing anvil 63 having a ball end 64 adapted to contact either the external surface 54 or the internal surface 48. The convex surfaces 65 of the auxiliary anvil piece 56 are utilized to engage the internal surface 48. Also the piece 56 may be turned over and secured by the screws 58 when flat internal and external surfaces are encountered.

The centered zero position of the arm is controlled in both directions by a pair of opposite acting leaf springs or spring wires 66 and 67 which are rigidly fixed at their rear ends 68 to the arm 40 forwardly of the pin 43. The outer free ends of the spring wires 66 and 67 are confined in slots 69 in the extension portion 44 of the setting carriage 18. The outer end of one spring wire 66 is biased upwardly while the outer end of the other spring wire 67 is biased downwardly so that acting against the slots 68 they apply yielding opposed forces acting to rock the arm 40 about the pin 43 resulting in a neutral or intermediate positioning of the arm 40 and dial indicator in zero position with spring pressure control for either direction of actuation of the caliper when measuring either internal or external surfaces.

Formed in the outer end of the extension portion 44 of the setting carriage 18 is a bore 70 in which is vertically slidable the T-shaped centering adapter 71 having the stem 72 mounted by a close sliding fit in the bore 70. A stop screw 73 having an abutment washer 74 is carried in the threaded bore 75 in the stem 72 limits the upward travel of the centering adaptor relative to the extension portion 44 by the engagement of the washer with the surface 76 of the extension portion 44. Compression springs 77 contained in bores 78 in the cross bar portion 79 and engaging in aligned bores 80 in the extension portion 44 serve to yieldingly urge the centering adaptor contact points 81 yieldingly outwardly against an internal convex surface 82 being measured.

Figures 9, 11:
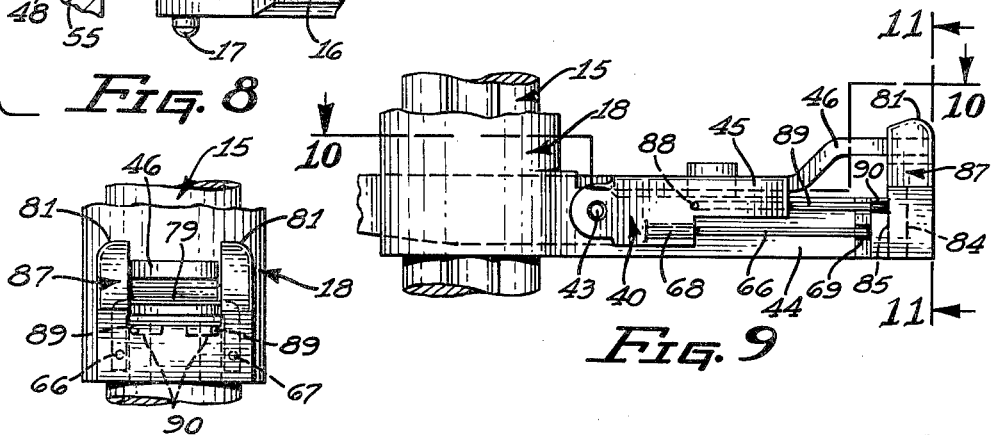
FIG. 9 is a fragmentary side elevation of the apparatus showing a modification of the actuating arrangement for the centering device.
FIG. 11 is an end view indicated by the line 11—11 of FIG. 9.

In FIGS. 9, 10 and 11 is shown a modification of the mounting arrangement for the centering adaptor in which the outer end of the extension portion 44 has a T-shaped end 83 formed thereon comprising the outer surface 84 the coplanar surfaces 85 and the end surfaces 86 upon which accurately slides the centering adaptor 87 having the work contacts 81. Fixed at their rear ends 88 to the intermediate portion of the extension portion 44 are the spring wires 89, the front ends of which engage in appropriate slots 90 formed in the centering adaptor 87 so as to yieldingly upwardly urge said adaptor, FIGS. 9 and 11, relative to the extension portion 44 while precisely and accurately guided on the surfaces 84, 85 and 86 thereof.

While the apparatus herein disclosed and described constiutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A dial indicator caliper gage comprising in combination.
  a. a frame,
  b. an integral laterally extending anvil arm,
  c. a work contacting anvil fixed on the outer end of said laterally extending anvil arm having,
  d. a work contacting surface facing in both directions of longitudinal extent of said frame,
  e. a setting carriage slidable longitudinally on said frame,
  f. a clamiping plug actuated by a thumb screw on said setting carriage to engage said frame for clamping said carriage to said frame,
  g. a dial gage clamping bracket formed integral with said setting carriage having a plurality of radially spaced dial gage mounting bores having their axes extending parallel to the direction of movement of said setting carriage on said frame and lying in a plane passing through said work contacting anvil,
  h. a dial indicator having,
  i. a mounting barrel adapted to be accurately positively located in each of said mounting bores,
  j. an actuating stem on said dial indicator,
  k. an arm pivoted intermediate its ends on said carriage,
  l. an abutment surface defining a plane located at right angles to said plane passing through said work contacting anvils and said dial gage bore axes on one end of said pivoted arm adapted to engage the outer end of said actuating stem of said dial indicator when mounted in any of said mounting bores in said dial gage clamping bracket,
  m. a work sensing abutment surface on the other end of said pivoted arm facing in both directions longitudinally of said frame and in longitudinal alignment with said work contacting anvil on said laterally extending anvil arm.
  n. and a centering adaptor on said setting carriage associated with said work sensing abutment surface.

2. A dial indicator caliper gage comprising in combination:
  a. a frame,
  b. an integral laterally extending anvil arm,
  c. a work contacting anvil fixed on the outer end of said laterally extending anvil arm having,
  d. a work contacting surface facing in both directions of longitudinal extent of said frame,
  e. a setting carriage slidable longitudinally on said frame,
  f. a clamping plug actuated by a thumb screw on said setting carriage to engage said frame for clamping said carriage to said frame,
  g. a dial gage clamping bracket formed integral with said carriage having a plurality dial gage mounting bores having their axes extending longitudinally of said bracket,
  h. a dial indicator having,
  i. a mounting barrel adapted to be gripped in each of said mounting bores,
  j. an actuating stem on said dial indicator,
  k. an arm pivoted intermediate its ends on said carriage,
  l. an abutment surface on one end of said pivoted arm adapted to engage the outer end of said actuating stem of said dial indicator when mounted in any of said mounting bores in said dial gage clamping bracket,
  m. a work sensing abutment surface on the other end of said pivoted arm facing in both directions longitudinally of said frame and in longitudinal alignment with said work contacting anvil on said laterally extending anvil arm,
  n. a pair of spring wires each having one end fixed to said arm, one biased in one direction and the other biased in the opposite direction,
  o. and slots in said setting carriage engaging the outer free ends of said spring wires whereby said arm is yieldingly supported in neutral zero position of said dial indicator.

3. A dial indicator caliper gage comprising in combination:
 a. a frame,
 b. an integral laterally extending anvil arm,
 c. a work contacting anvil fixed on the outer end of said laterally extending anvil arm having,
 d. a work contacting surface facing in both directions of longitudinal extent of said frame,
 e. a setting carriage slidable longitudinally on said frame,
 f. a clamping plug actuated by a thrumb screw on said setting carriage to engage said frame for clamping said carriage to said frame,
 g. a dial gage clamping bracket formed integral with said carriage having a plurality dial gage mounting bores having their axes extending longitudinally of said bracket,
 h. a dial indicator having,
 i. a mounting barrel adapted to be gripped in each of said mounting bores,
 j. an actuating stem on said dial indicator,
 k. an arm pivoted intermediate its ends on said carriage,
 l. an abutment surface on one end of said pivoted arm adapted to engage the outer end of said actuating stem of said dial indicator when mounted in any of said mounting bores in said dial gage clamping bracket,
 m. a work sensing abutment surface on the other end of said pivoted arm facing in both directions longitudinally of said frame and in longitudinal alignment with said work contacting anvil on said laterally extending anvil arm,
 n. a pair of spring wires each having one end fixed to said arm, one biased in one direction and the other biased in the opposite direction,
 o. slots in said setting carriage engaging the outer free ends of said spring wires whereby said arm is yieldingly supported in neutral zero position of said dial indicator,
 p. and a further spring acting between said arm and said setting carriage adapted to oppose the force exerted by said plunger of said dial indicator on said arm.

4. A dial indicator caliper gage comprising in combination:
 a. a frame,
 b. an integral laterally extending anvil arm,
 c. a work contacting anvil fixed on the outer end of said laterally extending anvil arm having,
 d. a work contacting surface facing in both directions of longitudinal extent of said frame,
 e. a setting carriage slidable longitudinally on said frame,
 f. a clamping plug actuated by a thrumb screw on said setting carriage to engage said frame for clamping said carriage to said frame,
 g. a dial gage clamping bracket formed integral with said carriage having a plurality dial gage mounting bores having their axes extending longitudinally of said bracket,
 h. a dial indicator having,
 i. a mounting barrel adapted to be gripped in each of said mounting bores,
 j. an actuating stem on said dial indicator,
 k. an arm pivoted intermediate its ends on said carriage,
 l. an abutment surface on one end of said pivoted arm adapted to engage the outer end of said actuating stem of said dial indicator when mounted in any of said mounting bores in said dial gage clamping bracket,
 m. a work sensing abutment surface on the other end of said pivoted arm facing in both directions longitudinally of said frame and in longitudinal alignment with said work contacting anvil on said laterally extending anvil arm,
 n. a centering adaptor on said setting carriage associated with said work sensing abutment surface,
 o. said centering adaptor including,
 p. a guide stem portion having limited sliding movement on said carriage longitudinally of said frame,
 q. a cross bar portion formed integral with said guide stem portion having convex work contacting surfaces each side of said sensing abutment,
 r. and a further pair of spring wires having their rear ends fixed to said setting carriage,
 s. and further slots in said guide stem portion of said centering adaptor adapted to receive the outer free ends of said further pair of spring wires so as to yieldingly urge said centering adaptor toward a concave internal surface to be measured on a workpiece.

References Cited by the Examiner
UNITED STATES PATENTS

| 2,337,509 | 12/1943 | Todd | 33—148 |
| 2,542,537 | 2/1951 | Klemm | 33—27 |
| 2,661,542 | 12/1953 | Bean | 33—179.52 |
| 3,070,891 | 1/1963 | Neslund | 33—178 |
| 3,114,206 | 12/1963 | Eckert | 33—148 |

FOREIGN PATENTS

| 1,096,953 | 2/1955 | France. |
| 646,248 | 11/1950 | Great Britain. |
| 118,670 | 4/1947 | Sweden. |

ISAAC LISANN, *Primary Examiner.*